United States Patent [19]

Fujii et al.

[11] Patent Number: 5,115,179
[45] Date of Patent: May 19, 1992

[54] PORTABLE TEACHING APPARATUS

[75] Inventors: Kenjiro Fujii, Funabashi; Masao Oura, Yachiyo; Kazuyuki Tuburaya, Akikawa; Shigehisa Hagura, Tokyo, all of Japan

[73] Assignee: Hitachi, Ltd., Tokyo, Japan

[21] Appl. No.: 251,887

[22] Filed: Sep. 30, 1988

[30] Foreign Application Priority Data

Oct. 2, 1987 [JP] Japan .................. 62-247853

[51] Int. Cl.⁵ .............................. G05B 19/42
[52] U.S. Cl. .................. 318/568.13; 318/568.11; 318/568.12; 901/3; 200/52 R; 200/5 R; 364/191
[58] Field of Search ............... 318/560-640; 364/513, 190-193, 188, 189, 474.23, 424.07; 901/2, 3, 4, 5, 6, 7, 8, 9, 12, 15, 17-23, 49; 200/6, 5, 157, 61.85, 61.58 R, 52 R, 5 R; 446/456

[56] References Cited

U.S. PATENT DOCUMENTS

| | | | |
|---|---|---|---|
| 3,906,439 | 9/1975 | Pitman et al. | 200/157 X |
| 4,379,335 | 4/1983 | Kirsch et al. | 318/568.13 |
| 4,420,812 | 12/1983 | Ito et al. | 364/513 |
| 4,507,593 | 3/1985 | Gohrich et al. | 318/563 |
| 4,517,424 | 5/1985 | Kroczynski | 200/5 R X |
| 4,517,652 | 5/1985 | Bennett et al. | 901/3 X |
| 4,518,836 | 5/1985 | Wooldridge | 200/61.54 |
| 4,757,459 | 7/1988 | Laucher et al. | 364/513 |
| 4,815,011 | 3/1989 | Mizuno et al. | 364/513 |
| 4,888,708 | 12/1989 | Brantmark et al. | 364/513 |

FOREIGN PATENT DOCUMENTS

| | | |
|---|---|---|
| 3606439 | 12/1986 | Fed. Rep. of Germany . |
| 2191403 | 2/1974 | France . |
| 63-06078 | 8/1988 | Japan . |
| 1149258 | 4/1969 | United Kingdom . |

OTHER PUBLICATIONS

"Designing the robot teach pendant", Robotics Engineering vol. 8, No. 11, Nov. 1986, pp. 23-25.

*Primary Examiner*—Paul Ip
*Attorney, Agent, or Firm*—Antonelli, Terry, Stout & Kraus

[57] ABSTRACT

A portable teaching apparatus comprises interlock cancellation switches and at least one operating switch for producing a signal which remains effective only when the interlock cancellation switch is depressed. A boxlike body with the operating switch arranged on the front surface thereof include two parallel strips of apexes on the back side thereof. Slopes which steadily approach the front side and continued from the apexes are formed between the two strips of apexes. The operating buttons of the interlock cancellation switches are mounted on the slopes respectively.

11 Claims, 5 Drawing Sheets

PORTABLE TEACHING APPARATUS

BACKGROUND OF THE INVENTION

1. Field of the Invention

The present invention relates to an operating board for controlling the operation of industrial robots and other automatic machines, or more particularly, to a hand-held portable teaching apparatus suitable for operating these machines or teaching jobs to them.

2. Description of the Related Art

In teaching a series of operations to an industrial teaching playback robot (hereinafter merely called "the robot"), the robot is actually operated manually, and various data thus generated are edited and stored or necessary data is added in accordance with the operations and stored as required. This teaching process is often implemented in the neighborhood of the robot, that is, within the operating range of the robot by a handheld manually-operable teaching apparatus. As a result, the operator is exposed to the danger of an erroneous operation or runaway of the robot.

Some means is required to secure the safety of the operator (teacher). A teaching apparatus equipped with such means is capable of producing a signal only when a key for designating the direction of operation or the conditions for operation of the robot, for example, is depressed directly. Should the operator lose his consciousness, however, and fall on the teaching apparatus, the keys would remain depressed. In the case of an error in robot operation or a runaway thereof, on the other hand, the operator might be upset and unable to perform proper stopping operations.

In order to solve this problem what is called a "deadman switch" may be provided, which ignores the entries of keys in view of the fact that the hand of the operator leaves the teaching apparatus, in most cases of emergency such as the loss of consciousness. Patents related to this type of apparatus include JP-A-60-153789 (UM), for example.

Conventional teaching apparatuses suggested include a deadman switch operated by the thumb. In these prior art apparatuses, keys are operated in most cases by the forefinger of the idle hand not holding the apparatus, and when it is desired to operate a pair of keys at a time, the operator may want to use also a finger of the hand holding the teaching apparatus. The thumb which is the only idle finger of the hand holding the teaching apparatus, however, is already occupied to operate the deadman switch. As a consequence, the simultaneous operation of a pair of keys by both hands has not been realized. Also, the thumb is easily exhausted as the operation of the deadman switch is concentrated on the thumb.

SUMMARY OF THE INVENTION

The present invention has been developed in view of the above-mentioned facts, and an object thereof is to provide a portable teaching apparatus comprising a deadman switch by which two keys can be operated at a time by both hands.

Another object of the present invention is to provide a portable teaching apparatus in which the fatigue resulting from the operation of the deadman switch is minimized.

More specifically, according to the present invention, there is provided a portable teaching apparatus comprising interlock cancellation switches and operating switches, wherein a signal of an operating switch is effective only when an interlock cancellation switch is depressed, the apparatus further comprising a box-shaped body with the operating switches arranged on the surface thereof, a plurality of grips originating from the sides of the body and each having an apex inward of the side of the body and a slope on the back side of the central part of the body continued toward the front side, and the interlock cancellation switch as a deadman switch mounted on the slope inward of the apex of each grip.

According to another aspect of the invention, fingers extended on the back of each grip, such as the forefinger, middle finger, the third finger or the little finger, may be used to operate the deadman switches while at the same time holding the teaching apparatus. This sets free the thumb holding the teaching apparatus and enables it to participate in key operation.

According to still another aspect of the invention, each deadman switch can be operated by the forefinger, the middle finger, the third finger and/or the little finger, so that the weight of the teaching apparatus is exerted on these fingers. The deadman switch becomes thus ready for operation automatically by holding the apparatus by the grips. As a result, the operation of the deadman switch is distributed among the fingers, thereby reducing the exhaustion of these fingers.

According to a further aspect of the invention, each deadman switch is arranged on a slope of each grip, which slope is directed inward, and therefore the teaching apparatus is not carelessly operated when placed on the ground or the desk.

BRIEF DESCRIPTION OF THE DRAWINGS

FIGS. 1 to 8 show an embodiment of the present invention, in which:

FIG. 1 is a schematic diagram showing a sectional view of the construction of a portable teaching apparatus;

FIG. 2 is a plan view showing a general appearance of the apparatus;

FIG. 3 is a circuit diagram for explaining the functions of a deadman switch;

FIGS. 4 and 5 are diagrams showing the apparatus held by a hand; and

FIGS. 6, 7 and 8 are side views showing a general appearance respectively.

In this connection, FIGS. 1, 4 and 5 are views taken along the line W—W in FIG. 2, and FIGS. 6, 7 and 8 are views taken along the line Y—Y, directions X and Z respectively.

DESCRIPTION OF THE PREFERRED EMBODIMENTS

Figure 1:
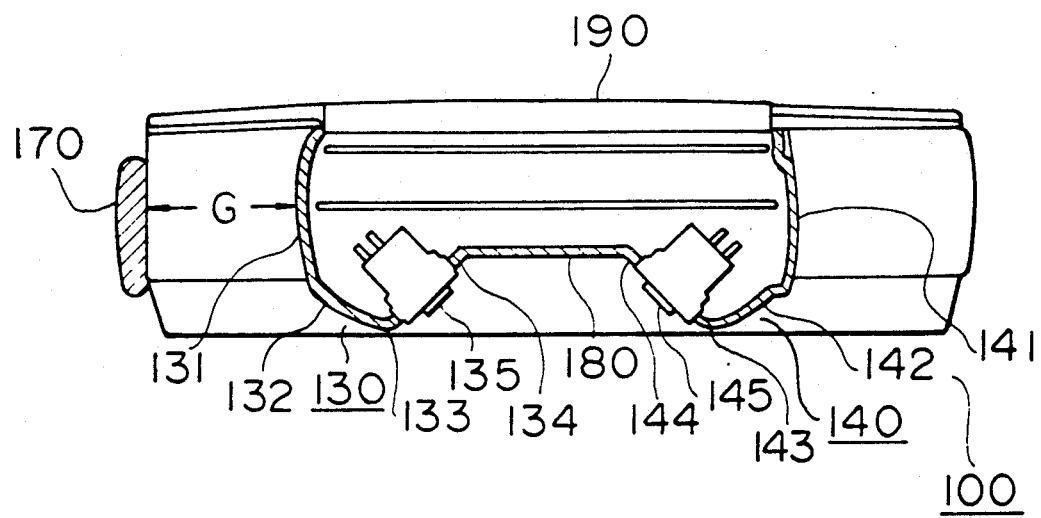

Reference numeral 100 designates a substantially T-shaped box as a body, on which a display unit 110 and an emergency stop switch 120 are arranged at the upper part of the surface 190 with operating switch groups A, B and C including a multiplicity of operating switches 200 arranged at the lower part thereof. Numerals 130, 140 designate two strips of grips arranged in parallel to each other on the back side 180 of the body 100. The grips 130, 140 start from the sides 131, 141 respectively in opposed relationship with the body 100, and have internal apexes 133, 143 through slopes 134, 144 from the sides 131, 141, and also slopes 134, 144 continued from the back side 180 at the central part of the body 100. Numerals 135, 145 designate interlock cancellation switches as deadman switches arranged within the slopes 134, 144 in opposed relations to each other at the grips 130, 140. Operating buttons of the interlock cancellation switches 135, 145 are arranged to be fully extended in longitudinal direction (vertical direction in FIG. 2) of the slopes 134, 144 avoiding the apexes 133, 143 of the grips 130, 140, respectively. Specifically, the operating buttons of the interlock cancellation switches 135, 145 have a sufficient size (length) to be engaged with a forefinger which is curled on the backside of the grips 130, 140 when the bottom of the grips 130, 140 are gripped, and to be engaged with a small finger curled on the backside of the grips 130, 140 when the top of the grips 130, 140 are grasped respectively. The operating buttons may alternatively be configured in somewhat raised form from the slopes 134, 144 on which they are arranged, so that when they are depressed, the buttons settle into the slopes 134, 144. Numeral 170 designates a substantially L-shaped handle facing the left side 131 of the body 100 through a clearance G and coupled to the body 100 by being extended toward the upper side 150 and the lower side 151 of the body 100, and numeral 153 a connector for an output cable at the bottom of the lower side 151.

Figure 4:
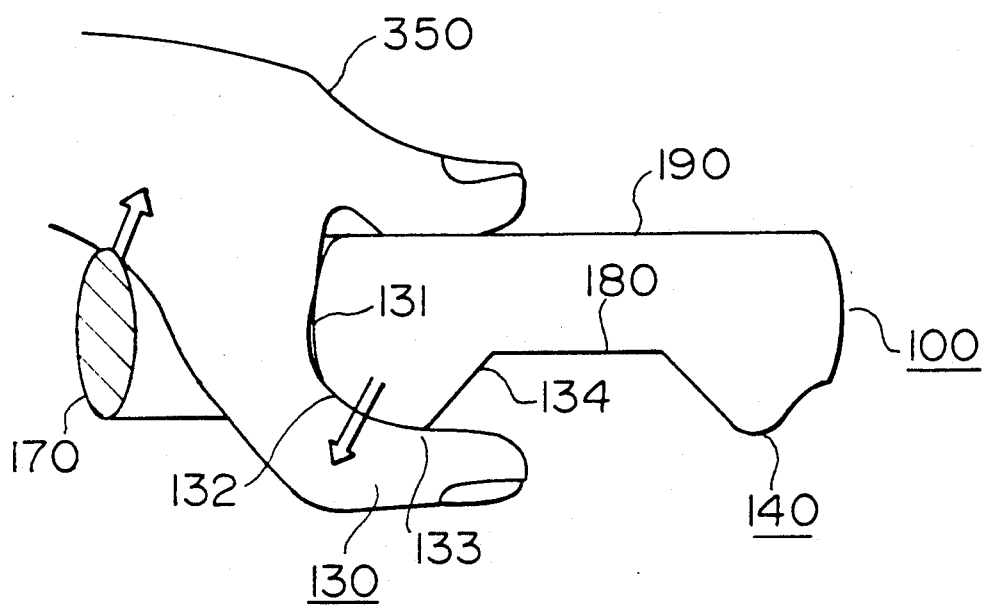
Figure 5:
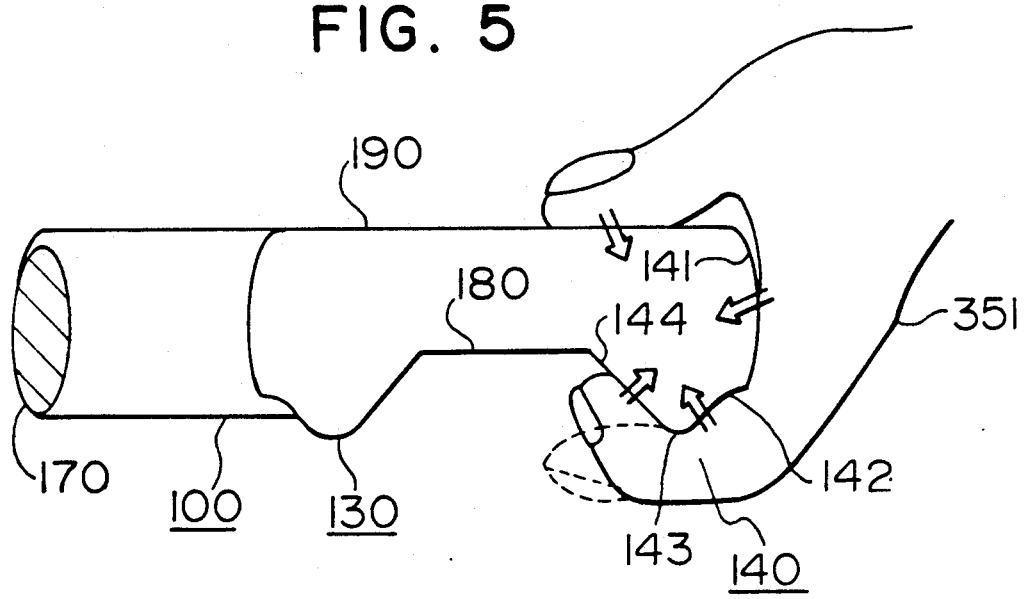
Figure 6:
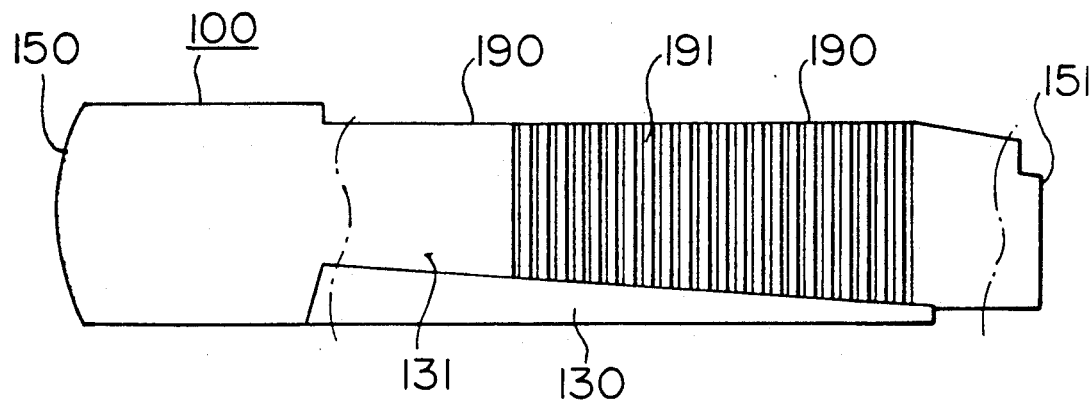
Figure 7:
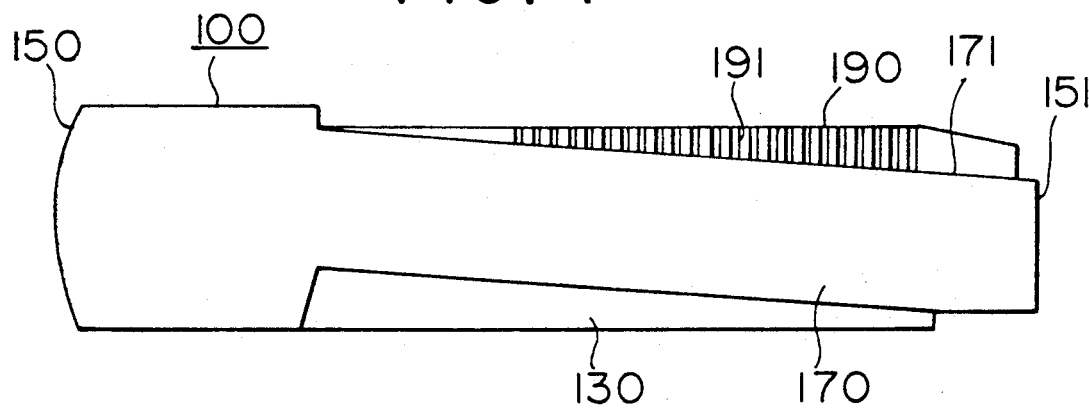
Figure 8:
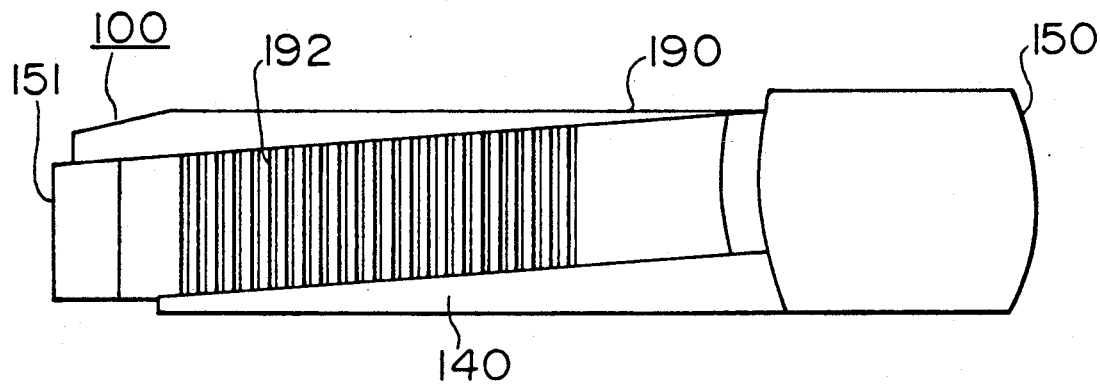

As shown in FIGS. 4 and 5, in order for the grips 130, 140 of the back side of the body 100 to be held fully by the palm and fingers other than the thumb, the grips 130, 140 are formed in proper sizes and inclinations of the slopes 132, 142, 134, 144 as well as the height of the apexes 133, 143. Also, the sides 131, 141 of the grips 130, 140 are formed with a multiplicity of grooves 191, 192 extending from the front 190 toward the back side 180. The ends of the grooves 191 progressively approach the back side 180 downward of the body 100, and the starting points and ends of the grooves 192 progressively come away from the extension of the surface 190 (approach the back side 180) downward of the body 100. Further, the upper side 171 of the handle 170 is inclined to come away progressively from the extension of the surface 190 of the body 100 downward of the body 100. The clearance G between the handle 170 and the side 131 of the body 100, on the other hand, is selected with such a proper size that does not give a tight feeling to the palm against the handle 170 when the grip 130 is held. Furthermore, the sides 131, 141, the slopes 132, 134, 142, 144 and the apexes 133, 143 making up the grips 130, 140, may be configured by a combination of proper curvatures fitting the hand snugly.

Figure 3:
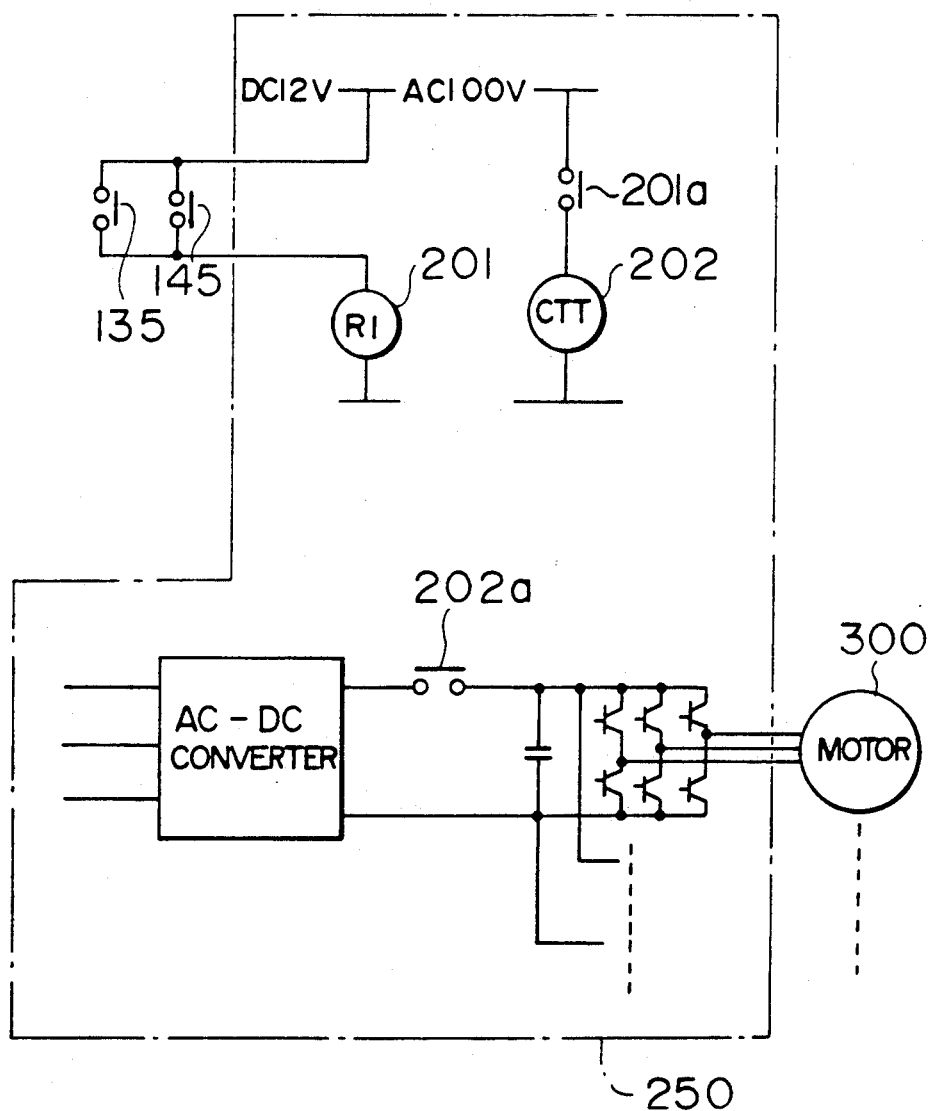

Now, FIG. 3 shows an example of a simple circuit for turning on and off the power supply to a motor 300 for driving the robot by the interlock cancellation switches 135, 145. Actually, various types of interlock are required both in hardware and software at the time of turning on a servo system, and this circuit is for cutting off power to the motor 300 for driving the arms of the robot, for example, after operating a brake circuit to prevent a runaway. Specifically, when the finger leaves the interlock cancellation switches 135, 145 with the contacts thereof opened, a relay 201 in a robot control circuit 230 is released so that a contact 201a thereof opens. Further, a breaker 202 is released, and a contact 202a thereof in the power unit of the motor 300 opens, thus cutting off power supply to the motor 300.

Figure 2:
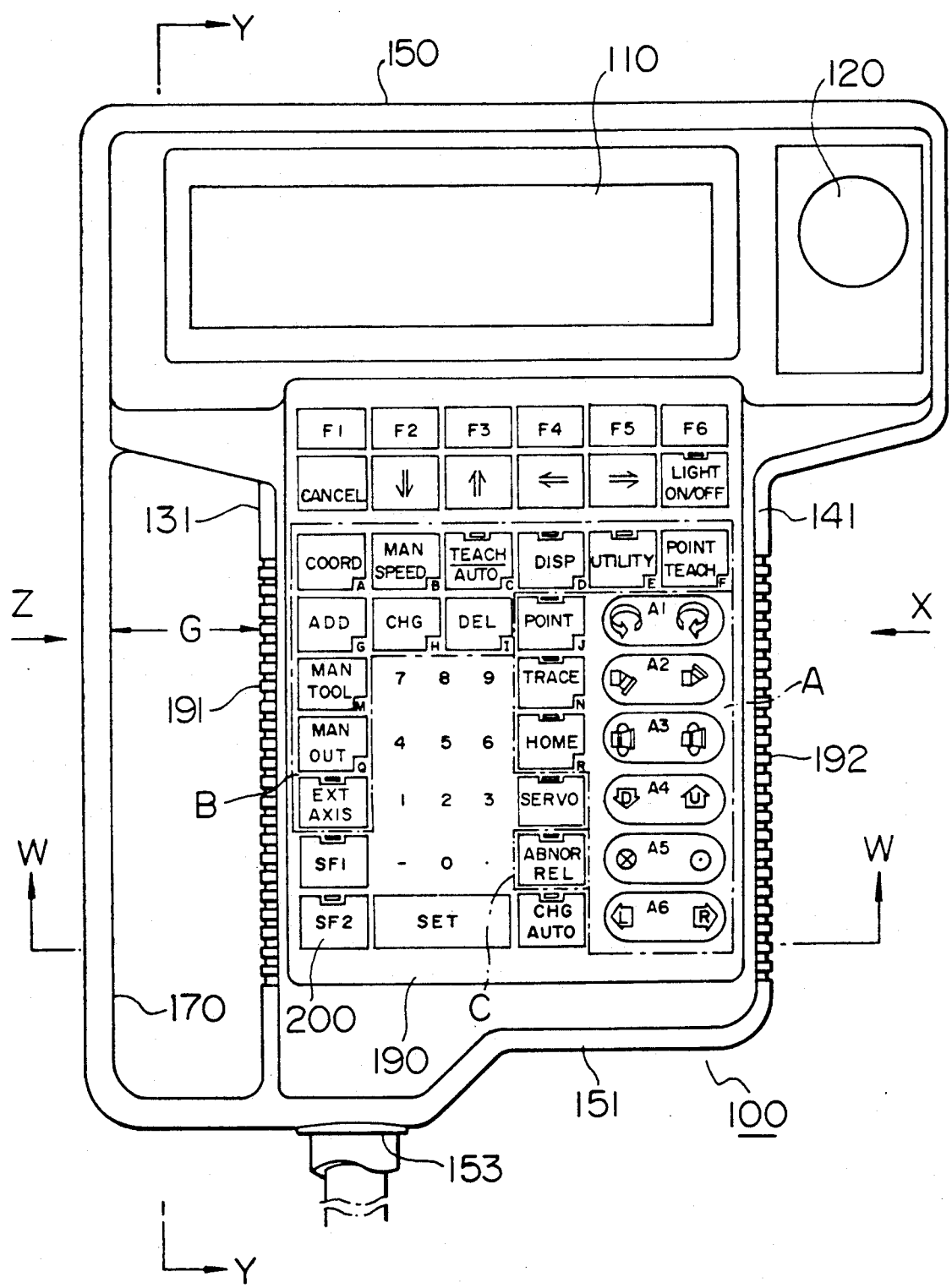

Now, the procedure for operation of a portable teaching apparatus configured in the manner mentioned above will be explained. FIG. 2 shows an arrangement of the operating switches 200. The operating switch group A includes switches of deadman control type for manual operation of the robot. Since the operation of these switches is naturally followed by actual motion of the robot, it is necessary to keep the interlock cancellation switches 135, 145 making up deadman switches. The operating switch group B, on the other hand, includes the operating switches 200 for changing the operating conditions or the teaching work of the robot. Since these switches are operated frequently during manual operation of the robot, however, it is not preferable to evaluate the conditions of the deadman switches each time of the operation. The operating switches 200 making up the operating switch group C, provided for cancelling trouble, are kept depressed while the operating switches 200 making up the group A are required to be depressed at such a time as an overrun of the robot. In this case, too, it is not preferable to evaluate the conditions of the deadman switches and turn off the servo system for driving the robot. In view of this, the embodiment under consideration is so constructed that in the case where the conditions of the deadman switches are evaluated and the fingers have left them while the operating switches A are being operated, the robot motion is immediately stopped by turning off the servo system thereof. Specifically, in FIG. 4 and FIG. 5 showing the grips 130, 140 held in the right hand 350 and the left hand 351 respectively, assume that the fingers have left the operating buttons of the interlock cancellation switches 135, 145 embedded in the slopes 134, 144. The robot operation is immediately stopped. This is easily realized by extending the first joint of the finger (except for the thumb) holding the grips 130, 140. In addition, in view of the fact that the behavior of the fingers operating the interlock cancellation switches 135, 145 is identical to that of the fingers holding the grips 130, 140 of the body 100, the operator is able to continue the robot operation both safely and accurately without feeling any fatigue or being conscious of the existence of the deadman switches. Further, the body 100 can be held accurately by the grips 130, 140 in at least one palm and finger (except for the thumb), and therefore the thumb of the hand holding the grips 130, 140 as well as the fingers of the hand not holding the grips 130, 140 are set free. The operating range of the operating switches 200 arranged on the surface 190 of the body 100 is thus widened.

Further, the embodiment under consideration is provided with a handle 170. Therefore, as shown in FIG. 4, the body 100 can be held without completely grasping the grip 130 in the left hand 350. Also, the height of the upper side 171 of the handle 170 is lowered progressively toward this side (the lower side) of the body 100. It is thus possible to lay (displace outward) the palm of the hand 350 sufficiently on this side of the handle 170, thus widening the range in which the thumb of the hand 350 can be moved along the surface 190 of the body 100 (even while depressing the deadman switches). It is also of course possible to carry the portable teaching apparatus by the handle 170.

Furthermore, the grooves 191, 192 in the sides 131, 141 of the body 100 respectively makes possible accurate grasping of the grips 130, 140. At the same time, the fact that the starting or ending point of the grooves 191, 192 is inclined downward of the body 100 enables the operator to confirm to some degree the position of grasping 130, 140 by the feeling of the grips 130, 140, thereby making the operation of the operating switches 200 more smooth. In addition, in the embodiment under consideration with the interlock cancellation switches 135, 145 arranged on the slopes 134, 144 inward of the apexes 133, 143 of the grips of 130, 140, the interlock cancellation switches 135, 145 are not depressed by error when the portable teaching apparatus is placed on the floor or desk. In other words, should the operator in the teaching work drop the portable teaching apparatus on the floor carelessly, or should the operator be involved in some accident, leaving the apparatus, the interlock cancellation switches 135, 145 are left accurately, thus stopping the robot motion without fail immediately.

We claim:

1. A portable teaching apparatus comprising:
   at least one interlock cancellation switch means connected to a robot control circuit for directly interrupting a power supply to a motor of a robot when said interlock cancellation switch means is not operated;
   at least one operating switch for manual operation of the robot wherein a signal of the operating switch is effective only when the interlock cancellation switch means is operated;
   a box-shaped body with the at least one operating switch arranged on a surface thereof;
   at least one grip which, starting from sides of the body, as an apex inwardly of the sides of the body in at least one slope continuing toward a surface of the body on a back side thereof; and
   wherein said interlock cancellation switch means is mounted in the slope inwardly of the apex of the grip.

2. A portable teaching apparatus according to claim 1, wherein the interlock cancellation switch means includes at least one operating button extending from the apex of the grip into the slope at a central part of the back of the body along the longitudinal direction of the grip.

3. A portable teaching apparatus according to claim 1, wherein the grip includes a plurality of grooves extending from a front side of the body toward the back side thereof.

4. A portable teaching apparatus comprising:
   at least one interlock cancellation switch means connected to a robot control circuit for directly interruption a power supply to a motor of a robot when said interlock cancellation switch means is not operated;
   at least operating switch for manual operation of the robot wherein a signal from the operating switch remains effective only when the interlock cancellation switch is operated;
   a substantially T-shaped body in a box form with the at least one operating switch, an emergency stop switch and a display unit arranged on a surface thereof;
   two strips of grips starting from opposite sides of the body and continuing to a back side of the body at a central part of the body, the grips having apexes inwardly of the opposite sides of the body;
   a handle facing sides of the body through a clearance and coupled to the body by being extended to upper and lower surfaces of the body, and
   wherein the at least one interlock cancellation switch means is mounted within the opposite slopes of the grips.

5. A portable teaching apparatus according to claim 4, wherein a plurality of interlock cancellation switch means are provided, each of said interlock cancellation switch means include operating buttons extending from the apexes of the grips into the slopes at the central part of the back side of the body along a longitudinal direction of the grips.

6. A portable teaching apparatus according to claim 4, wherein the grips include a plurality of grooves extending from a front surface of the body to the back side of thereof.

7. A portable teaching apparatus according to claim 4, wherein the handle is so constructed and arranged to extend away from an extension of a surface of the body progressively toward a lower side of the body.

8. A portable teaching apparatus according to claim 6, wherein ends of the plurality of the grooves approach the back side of the body progressively toward a lower side of the body.

9. A portable teaching apparatus according to claim 5, wherein a plurality of interlock cancellation switch means are provided, each of the interlock cancellation switch means include rectangular operating buttons adapted to come into contact with any fingers holding selected one of upper and lower ends of the grips.

10. A portable teaching apparatus comprising:
    at least one interlock cancellation switch means connected to a robot control circuit for directly interrupting a power supply to a motor of a robot when said interlock cancellation switch means is not operated;
    at least one operating switch for producing a signal which remains effective only when the at least one interlock cancellation switch means is operated;
    a box-like body having a front surface at which the at least one operating switch is arranged and a grip on a back side thereof, and
    wherein the at least one interlock cancellation switch means includes operating buttons recessed toward a front side from the grip.

11. A portable teaching apparatus according to claim 10, wherein the grip has a slope approaching the front side steadily, and wherein the operating buttons are arranged on the slope.

* * * * *